Aug. 19, 1947.  F. E. RUNGE  2,425,833
ELECTRON OPTICAL INSTRUMENT
Filed May 20, 1944  3 Sheets-Sheet 3
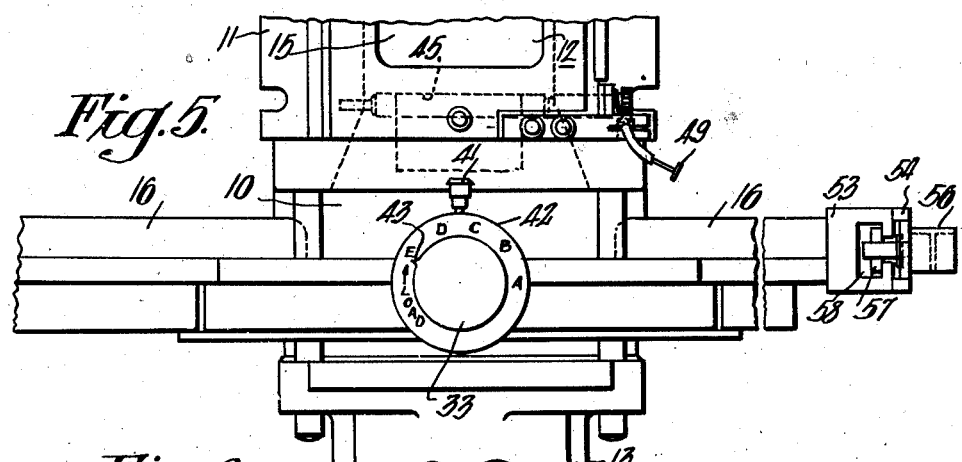
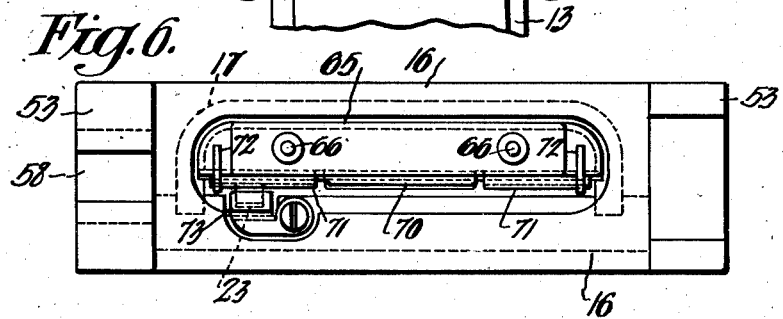
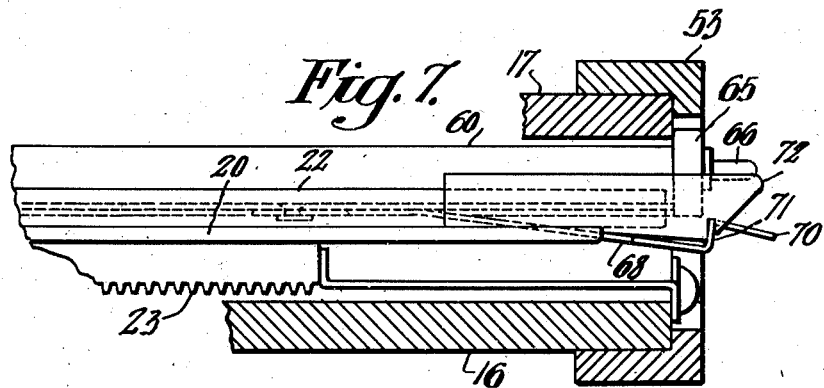
INVENTOR.
Frank E. Runge
BY
*Ruska*
ATTORNEY Patented Aug. 19, 1947

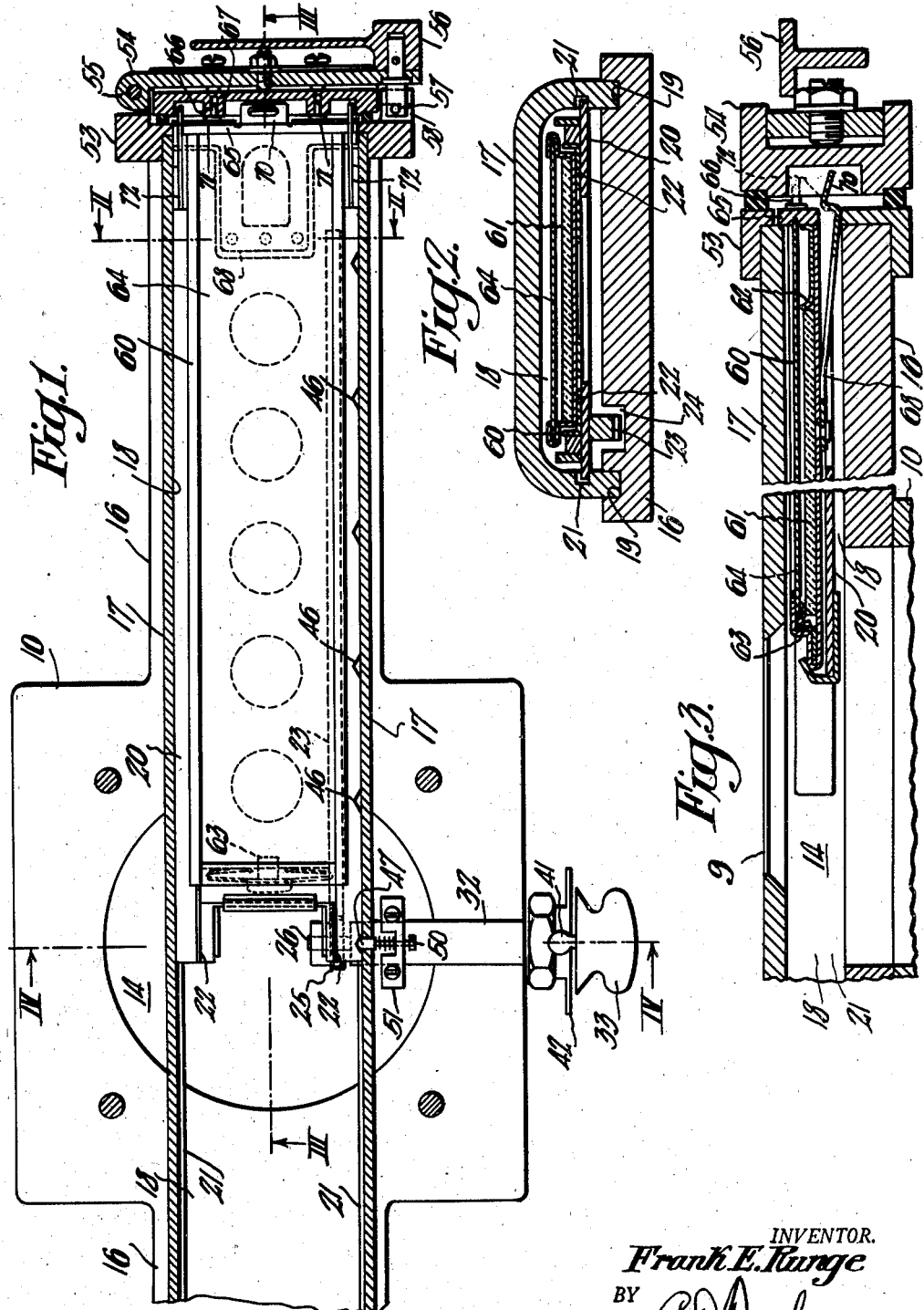

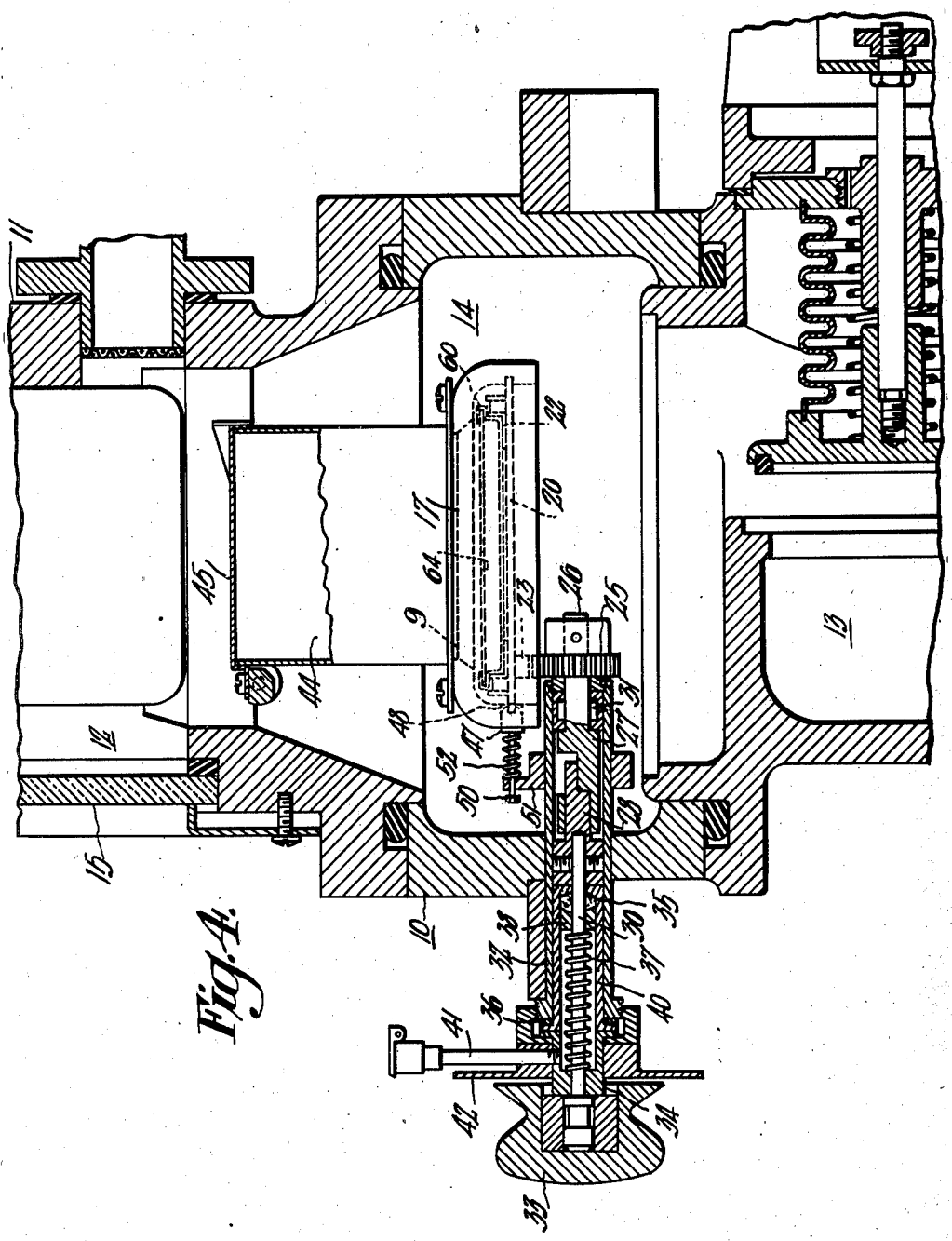

2,425,833

UNITED STATES PATENT OFFICE 2,425,833

ELECTRON OPTICAL INSTRUMENT

Frank E. Runge, Haddon Heights, N. J., assignor to Radio Corporation of America, a corporation of Delaware Application May 20, 1944, Serial No. 536,627

8 Claims. (Cl. 250—49.5)

1

The present invention relates to electron optical instruments and more particularly to an improved carriage and cassette for bringing a photographic plate or film into position for exposure.

In assemblies of the photographic chamber, the carriage and cassette of an electron optical instrument, it has heretofore been deemed necessary to control the positioning of the photographic plate by a complicated system of gears, shafts, flexible sealing devices, such as sylphons, and externally located indent plates. Due to back lash of gears and lost motion, the positioning of the photographic plate cannot be controlled with the high degree necessary to prevent overlapping of pictures or pictures which are too widely spaced.

Some of the objects of the present invention are: to provide an improved carriage control for the cassette of an electron microscope; to provide an improved cassette; to provide an improved means for attaching a cassette to the carriage of an electron microscope; to provide means for indicating the position of a photographic plate in a cassette with respect to the exposure frame of an electron microscope; to provide a novel interlock between a cassette and a carriage; to provide means for locking the mask of a cassette in position to protect the photographic plate from improper exposure; to provide a carriage construction wherein operating gears and connections are reduced to a minimum so that backlash and lost motion are negligible; to provide a photographic chamber, carriage and cassette wherein exposure of the plate can be made with extreme accuracy and overlapping or improper spacing of the pictures prevented; to provide a novel release for the mask of a cassette while interlocking the cassette and carriage; and to provide other improvements as will hereinafter appear.

In the acompanying drawings Figure 1 represents a plan in part section of the unit forming the photographic chamber of an electron microscope. Figure 2 represents a section on line II—II of Figure 1; Figure 3 represents a section on line III—III of Figure 1; Figure 4 represents a section on line IV—IV of Figure 1; Figure 5 represents a front elevation of the unit; Figure 6 represents an elevation of the loading end of the photographic chamber; and Figure 7 represents a detail in side elevation showing the interlocking mechanism between the cassette and the carriage.

Referring to the drawings, Figures 1 and 2 show those parts of an electron microscope to which the invention relates, namely, those parts associated with the annular column unit 10 which is interposed between the column section 11 forming the evacuable viewing chamber 12 and the section 13 in which the vacuum valve control is located. The unit 10 forms the photographic chamber 14 in which the carriage assembly is located to bring the cassette into exposing position in register with the lower end of the microscope column. The usual observation window 15 is provided in the side of the viewing chamber 12. It will be understood that the electron image beam enters the viewing chamber 12 and the photographic chamber 14 through parts not shown, such as the lens system and the aperture which encircles the optical axis of the microscope.

For housing the carriage assembly, the unit 10 is provided with oppositely disposed alined lateral extensions, formed by a base 16 and an inverted channel-shaped top 17, thereby providing two lateral passages 18 extending respectively from opposite sides of the unit 10 and communicating with the photographic chamber 14. The passages 18 are alined with respect to each other so that in effect a single interrupted passage is provided for the travel of the carriage. As shown, the sides of the top 17 are soldered, welded or otherwise made fast in grooves 19 provided in the base 16. These passages 18 form a way for the reception of the carriage and the cassette whereby the cassette is brought into register with the electron projected image.

In the present instance, the carriage comprises an elongated flat plate 20 of greater width than the passage 18 in order that its side edges can ride respectively in transversely alined grooves 21 provided in the side walls of the top 17 so that the carriage can slide parallel to the floor of the base 16. Upstanding guide rails 22 are fixed at opposite sides respectively of the plate 20 in such spaced relation as will accommodate the width of the cassette so that the latter can ride freely in the carriage without excessive lateral play.

For feeding the carriage across the photographic chamber 14 for a succession of exposures upon the photographic plate, the carriage plate 20 has a rack 23 fixed to the underside thereof and extending longitudinally thereof parallel to the sides of the plate 20. Preferably the base 16 has a groove 24 in register with and receiving the rack 23 for a compact assembly. Motion is transmitted to the rack 23 by a gear 25 within the chamber 14 and fixed to a shaft 26. This shaft 26 is formed as a part of a driven coupling member 27, to which the other member 28 transmits motion when rotated by a spindle 30 fixed thereto. The coupling together with the bearing 31 for the shaft 26 are housed in a sleeve 32 which enters the chamber 14 through the column unit 10 thereby to support the gear 25 in meshing relation with the rack 23. The sleeve 32 protrudes from the section 11 to house the spindle 30 and mount the parts associated with the hand knob 33 which is keyed to the spindle 30 for operating purposes. The knob end of the sleeve 32 is sealed against leakage by a closure cap 34 and stuffing box 35. Leakage along the spindle 30 is prevented by a gasket 36 encircling the spindle 30 and compressed by a coil spring 37 bearing against the gasket follower 38 at one end and at the other end against the cap 34. A tubular member 40 is fitted within the sleeve 32 to retain the spindle 30 and its sealing adjuncts properly positioned and sealed against leakage. An oil duct 41 leads to the interior of the assembly for lubricating the gasket and other parts. A dial 42 is fixed to the cap 34 in position for indicating the sweep of a pointer 43 attached to the knob 33. This dial 42 is provided with suitable indicia, such as "load" and A—B—C—D—E, the latter representing successive exposure positions of the carriage. Thus, by turning the knob 33 in one direction the gear 25 will cause the rack 23 to advance the cassette carriage into the chamber 14 for the purpose of exposing the photographic plate or film, while if turned in the opposite direction, the carriage will be withdrawn. The indicia upon the dial show the position of the carriage with respect to the picture aperture 9 in 17. This aperture is surmounted by a light tight hood 44, the top of which consists of a pivoted shutter 45 which may be opened and closed by means of the external control camera cable 49.

As a means for sensing the registration of the film or plate with the picture aperture 9, one edge of the plate 29, of the carriage, is provided with a plurality of V-shaped indentations or notches 46, all equally spaced apart a distance such that as each registers with the median plane of the aperture 9 it will be engaged by a spring pressed plunger 47 slidably mounted in a hole 48 extending through one side of the top 17, such hole 48 being in lateral alinement with the indented edge of the carriage. The stem 50 of the plunger 47 is slidably supported by a fixed part, such as a notched bushing 51 mounted upon the sleeve 32. The coil spring 52 encircles the stem 50 and is normally under compression to propel the plunger 47 into any indentation 46 which registers therewith.

For sealing the passage 18, one end is closed by a plate 53, while the carriage-receiving end is closed by a vacuum tight door 54 pivoted at 55 to the door frame and arranged to be locked in closed position by a hinged lever 56 operating a pin 57 into and transversely of a slot 58 in the door frame.

The cassette comprises a holder 60 for removably mounting the photographic plate 61 which lies face up upon the holder 60 between an abutment 62 at one end and a bowed spring 63 at the opposite end. The cassette cover or mask 64 is slidably mounted in the holder 60 to form a light-proof assembly and is removed when the plate is to be exposed. At one end the cover or mask 64 is fixed to a transverse end member 65 having a pair of outwardly disposed pins 66 to respectively enter holes 67 in the door 54 so that the mask 64 is positively supported when the carriage moves away.

In order to lock the mask 64 in closed position on the cassette, the holder 60 has a spring clip 68 riveted or otherwise secured to its underside and lying in contact with the under face of the mask end member 65 and terminating in an upwardly reversely bent extension tongue 70. Thus, when the mask 64 is pushed into the holder 60, the member 65 engages the tongue 70, presses it out of the way and when the member 65 reaches the closed position of the mask 64, the tongue 70 springs back around the bottom edge of the member 65 to prevent improper withdrawal of the mask 64. This clip 68 is also provided with two vertical flanges 71, which are spaced by the tongue 70 and serve to respectively engage two outwardly projecting hooks 72 on the cassette-receiving end of the carriage. These hooks 72 are so bevelled as to depress the clip 68, when contacted by the flanges 71, and thus allow the flanges 71 to snap into the hooks 72 when the cassette has reached its proper position on the carriage. When so latched, the clip 68 is unlocked from the member 65 and the casette and carriage move forwardly together while the mask remains fixed. A stop 73, fastened to the end of the base 16, is provided to limit the movement of the carriage such that removal of the cassette will not inadvertently also withdraw the carriage.

I claim as my invention:

1. In an electron optical instrument of the type having an evacuated column for directing a beam of electrons, a unit forming an evacuable photographic chamber in the path of said beam, a housing forming a way leading through said chamber, said housing having a framing aperture for an image projected by said beam, a carriage slidable in said way, said carriage including a support for a cassette, means within said unit and operable from the exterior of said unit for moving said carriage through said photographic chamber to expose different portions of a film to said beam for successive and discrete photographs, and means also in said unit for indicating the position of said carriage with respect to said framing aperture.

2. In an electron optical instrument of the type having an evacuated column for directing a beam of electrons, a unit forming an evacuable photographic chamber in the path of said beam, a housing forming a way leading through said chamber, said housing having a framing aperture for an image projected by said beam, a carriage slidable in said way and including a mounting for a cassette, means within said unit and operable from the exterior of said unit for moving said carriage through said photographic chamber, notches on said carriage, and spring pressed means alined with said notches and operating through said housing for successively engaging said notches as the carriage is moved to thereby indicate the position of the carriage with respect to said framing aperture.

3. In an electron optical instrument of the type having an evacuated column for directing a beam of electrons, a unit forming an evacuable photographic chamber in the path of said beam, a housing forming a way leading through said chamber, said housing having a framing aperture for an image projected by said beam, a carriage slidable in said way, a cassette carried by said carriage, means within said unit and operable from the exterior of said unit for moving said carriage through said photographic chamber, notches on said carriage, spring pressed means alined with said notches and operating through said housing for successively engaging said notches as the carriage is moved to thereby indicate the position of the carriage with respect to said framing aperture, and means exterior of said unit for visibly indicating the position of said carriage.

4. In an electron optical instrument of the type having an evacuated column for directing a beam of electrons, a unit forming an evacuable photographic chamber in the path of said beam, a housing forming a way leading through said chamber, said housing having a framing aperture for an image projected by said beam, a carriage slidable in said way, a cassette carried by said carriage, means within said unit and operable from the exterior of said unit for moving said carriage through said photographic chamber, notches on said carriage, and notch-engaging means including a dial exterior of said unit having carrier position indicia thereon for visibly indicating the position of said carriage.

5. In an electron optical instrument of the type having an evacuated column for directing a beam of electrons, a unit forming an evacuable photographic chamber in the path of said beam, a housing forming a way leading through said chamber, said housing having a framing aperture for an image projected by said beam, a carriage slidable in said way to successively align different film areas with said beam for successive and discrete photographs, a rack on said carriage, a gear meshing with said rack, a shaft fixed to said gear, a cassette carried by said carriage, means extending exterior of said unit for turning said gear to operate said carriage, a fixed dial having indicia corresponding to different positions of said carriage, and a pointer on said turning means for movement over the face of said dial.

6. In an electron optical instrument, a carriage, a holder for a photographic plate mounted for sliding engagement with said carriage, a mask slidable on said holder, latch means for locking said mask against movement relative to said holder, means on said carriage for releasing said latch to allow said holder and carriage to move together, and means attaching said latch to said carriage after release from said mask, whereby said holder and carriage move together to withdraw said mask and uncover the photographic plate.

7. In an electron optical instrument, a housing, a carriage in said housing, a holder for a photographic plate mounted for sliding engagement with said carriage, a mask slidable on said holder, means automatically operating to attach said holder to said carriage as said holder enters said housing, a door for said housing, and means associated with said door for supporting said mask as said carriage and holder move in said housing.

8. In an electron optical instrument having a photographic chamber, a housing forming a way leading through said chamber, a closure sealing one end of said housing, a vacuum tight door for gaining access to the other end of said housing, a carriage slidably mounted in said housing, means for moving said carriage, a cassette including a mask, means for attaching said cassette to said carriage, and means between said door and said mask for supporting the end of the mask as the carriage and cassette move along said way.

FRANK E. RUNGE.

REFERENCES CITED

The following references are of record in the file of this patent:

UNITED STATES PATENTS

| Number | Name | Date |
|---|---|---|
| 2,200,095 | Marton | May 7, 1940 |
| 2,292,279 | Marton | Aug. 4, 1942 |
| 2,003,387 | Ott | June 4, 1935 |
| 2,360,677 | Hillier | Oct. 17, 1944 |
| 2,264,209 | Krause | Nov. 25, 1941 |
| 2,272,843 | Hillier | Feb. 10, 1942 |